US012097529B2

(12) United States Patent
Nakagawa et al.

(10) Patent No.: US 12,097,529 B2
(45) Date of Patent: Sep. 24, 2024

(54) DECORATIVE OBJECT AND METHOD FOR MANUFACTURING DECORATIVE OBJECT

(71) Applicant: KAWASAKI MOTORS, LTD., Akashi (JP)

(72) Inventors: Fumihiro Nakagawa, Akashi (JP); Hiroaki Matsumiya, Kobe (JP); Yuuki Manabe, Kobe (JP); Kengo Yoshihara, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 0 days.

(21) Appl. No.: 17/860,947

(22) Filed: Jul. 8, 2022

(65) Prior Publication Data

US 2023/0016749 A1 Jan. 19, 2023

(30) Foreign Application Priority Data

Jul. 9, 2021 (JP) ................................. 2021-114168

(51) Int. Cl.

| | |
|---|---|
| ***B32B 3/10*** | (2006.01) |
| ***B05D 5/06*** | (2006.01) |
| ***B41M 3/00*** | (2006.01) |
| *B44F 1/02* | (2006.01) |
| *B44F 1/08* | (2006.01) |

(52) U.S. Cl.

CPC ............. *B05D 5/063* (2013.01); *B41M 3/008* (2013.01); *B44F 1/02* (2013.01); *B44F 1/08* (2013.01)

(58) Field of Classification Search

None

See application file for complete search history.

(56) References Cited

FOREIGN PATENT DOCUMENTS

| | | | | |
|---|---|---|---|---|
| JP | 05138832 | A | * | 6/1993 |
| JP | H1034833 | A | * | 2/1998 |
| JP | 2004358385 | A | * | 12/2004 |
| JP | 2019214171 | A | * | 12/2019 |
| JP | 6667854 | B1 | * | 3/2020 |

OTHER PUBLICATIONS

Machine translation of JP-2019214171-A (Year: 2019).*
JP-2004358385-A (Year: 2004).*
Machine translation of JP-6667854-B1 (Year: 2020).*
Machine translation of JPH1034833A (Year: 1998).*
Machine translation of JP-05138832-A (Year: 1993).*

* cited by examiner

*Primary Examiner* — Christopher M Polley

(74) *Attorney, Agent, or Firm* — PROCOPIO, CORY, HARGREAVES & SAVITCH LLP

(57) ABSTRACT

There are provided a decorative object and a manufacturing method thereof, which includes: an object to be decorated; a printed layer covering at least a part of a surface of the object to be decorated; and a color clear layer covering the printed layer. In accordance with changes in a transmission distance by which light is transmitted through the color clear layer, a slight change in appearances of the decorative object can be caused.

18 Claims, 4 Drawing Sheets

DECORATIVE OBJECT AND METHOD FOR MANUFACTURING DECORATIVE OBJECT

CROSS-REFERENCE TO RELATED APPLICATIONS

This application is based on and claims priority under 35 USC 119 from Japanese Patent Application No. 2021-114168 filed on Jul. 9, 2021, the contents of which are incorporated herein by reference.

TECHNICAL FIELD

The present disclosure relates to a technique for decorating an object to be decorated.

BACKGROUND ART

JP2019-214171A discloses a painted product in which a sheet body layer of a transfer sheet is transferred onto a base material, and a clear coat is painted thereon.

By using the transfer sheet, an expression printed on the transfer sheet can be reproduced on a surface of the base material.

There is a case in which various appearance expressions are desired for an object decorated by a printed layer of the transfer sheet.

SUMMARY OF INVENTION

Therefore, the present disclosure provides a technique which can increase an appearance expression of an object decorated by a printed layer.

According to an illustrative aspect of the present disclosure, a decorative object includes: an object to be decorated; a printed layer covering at least a part of a surface of the object to be decorated; and a color clear layer covering the printed layer.

According to another illustrative aspect of the present disclosure, a method for manufacturing a decorative object includes: providing an object to be decorated; forming a printed layer so as to cover at least a part of a surface of the object to be decorated; and forming a color clear layer by painting so as to cover the printed layer.

According to the present disclosure, it is possible to increase the appearance expression of the object decorated by the printed layer.

DESCRIPTION OF EMBODIMENTS

Hereinafter, a decorative object and a method for manufacturing the decorative object according to an embodiment will be described.

Figure 1:
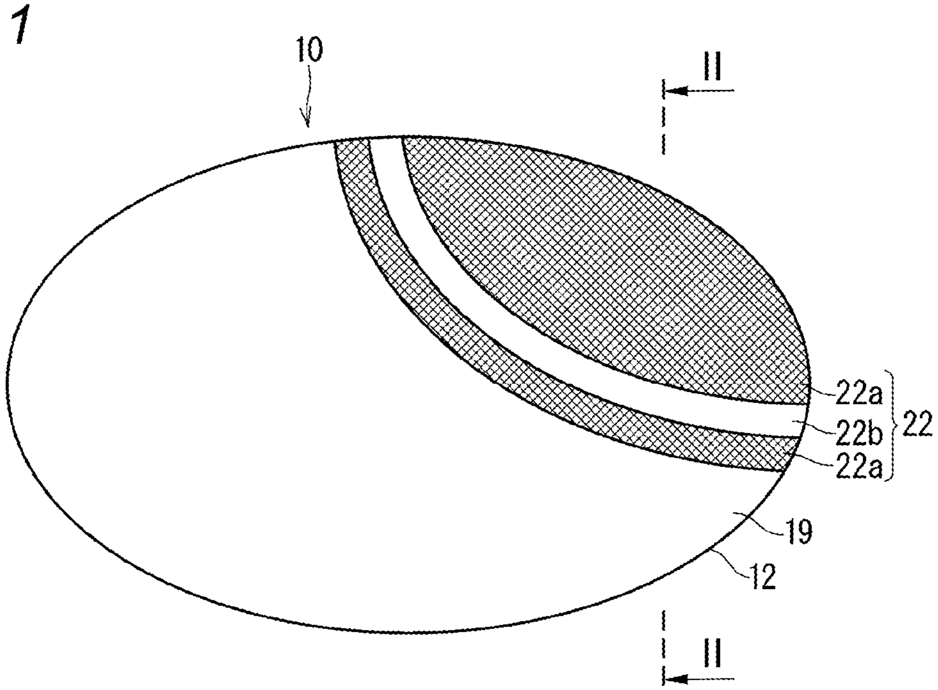
FIG. 1 is a front view showing a decorative object according to an embodiment.

FIG. 1 is a front view showing a decorative object 10. The decorative object 10 includes an object to be decorated 12, a printed layer 22, and a color clear layer 16.

The object to be decorated 12 is an object to which a decoration visually recognized is to be applied. The object to be decorated 12 is, for example, a fuel tank in a saddle-ride type vehicle. A material of the object to be decorated 12 is not particularly limited. The object to be decorated 12 may be a metal or a resin.

The printed layer 22 is a layer that is formed by printing and covers at least a part of a surface of the object to be decorated 12. The printing does not need to be performed on the surface of the object to be decorated 12. In FIG. 1, the printed layer 22 is formed in an upper right region of the object to be decorated 12.

The color clear layer 16 is a layer that covers the printed layer 22. The color clear layer 16 is a layer that includes a coloring element for coloring and has translucency. In FIG. 1, the color clear layer 16 is formed on the entire surface of the object to be decorated 12.

Figure 2:
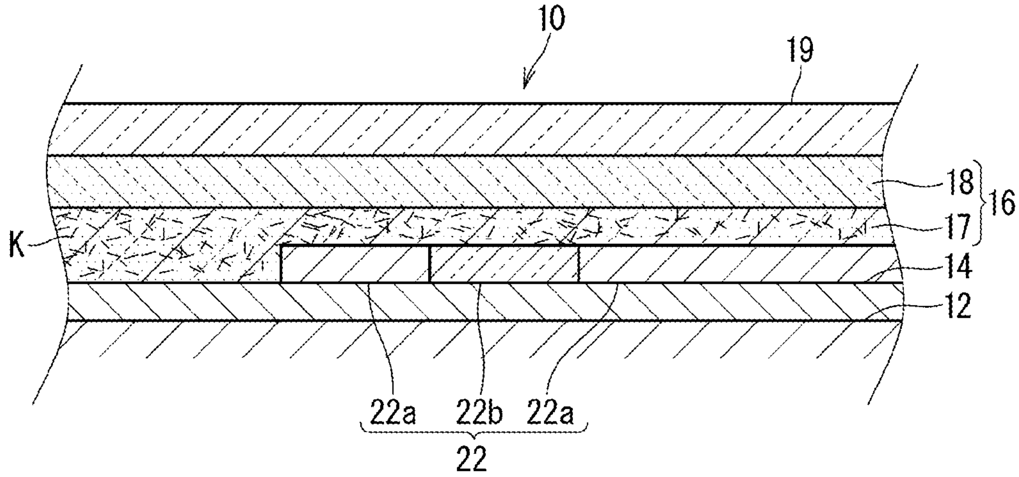
FIG. 2 is a partial cross-sectional view taken along a line II-II in FIG. 1.

FIG. 2 is a partial cross-sectional view taken along a line II-II in FIG. 1. As shown in the drawing, the object to be decorated 12 may include a coating film layer 14 and a transparent layer 19 in addition to the printed layer 22 and the color clear layer 16.

The coating film layer 14, the printed layer 22, the color clear layer 16, and the transparent layer 19 are formed in this order on the surface of the object to be decorated 12.

The coating film layer 14 is a layer that covers at least a part of the surface of the object to be decorated 12 between the surface of the object to be decorated 12 and the printed layer 22. The coating film layer 14 may be formed on a portion of the surface of the object to be decorated 12 that is observed from an outside in a normal use state of the object to be decorated 12. In the present embodiment, the coating film layer 14 is formed on the entire surface of the object to be decorated 12. The coating film layer 14 is formed by painting. The painting is formed by spraying a coating material on the surface of the object to be decorated 12 or brushing the coating material. The coating film layer 14 may be a layer having a uniform appearance on the surface of the object to be decorated 12. As long as the coating film layer 14 has the uniform appearance and is not coated, the coating film layer 14 can be easily formed on the surface of the object to be decorated 12 without performing coating by masking or the like. A color of the coating film layer 14 can be visually recognized from the outside through a transmission region 22*b* of the printed layer 22 or the color clear layer 16.

The coating material used for the coating film layer 14 is freely used. The coating material for forming the coating film layer 14 may be a color coating material or a color clear coating material. Bright particles may be mixed in the clear coating material. By forming a translucent layer of the color clear coating material on the surface of the object to be decorated 12, a film having a translucent candy appearance is formed. Painting the color clear coating material so as to exhibit the translucent candy appearance is sometimes referred to as candy painting. The coating film layer 14 may be omitted.

The printed layer 22 is a layer formed by printing. The printing refers to, for example, creating a printing plate expressing a design such as a pattern or a character, and reproducing the design using the printing plate. The printing plate may be any of a relief plate, an intaglio plate, a planographic plate, and a stencil plate. The printing does not need to be performed on the surface of the object to be decorated 12. For example, a printed matter made at a place different from the object to be decorated 12 may be attached and reproduced on the object to be decorated 12. Since the printed layer 22 is a layer formed by the printing, the printed layer 22 can express a coated pattern or a complicated pattern more easily than a layer formed by the painting. An example in which the printed layer 22 is implemented by a print sheet attached to the object to be decorated 12 will be described later.

The printed layer 22 may cover the entire surface of the object to be decorated 12, or may cover a part of the surface of the object to be decorated 12. In the present embodiment, the printed layer 22 covers a part of the surface of the object to be decorated 12. In the present embodiment, the printed layer 22 includes a plurality of colored regions 22*a* provided at an interval, and a transmission region 22*b* provided between the colored regions 22*a*. One colored region 22*a* extends to the upper right region of the object to be decorated 12. The annular transmission region 22*b* is provided outside the colored region 22*a* so as to surround the colored region 22*a*. The annular colored region 22*a* is provided outside the transmission region 22*b* (see FIG. 1). The colored regions 22*a* may be regions that blocks light such that the coating film layer 14 cannot be seen. In this case, when the decorative object 10 is observed from the outside, the color of the colored regions 22*a* is observed in the colored regions 22*a*, and the coating film layer 14 below the colored regions 22*a* is difficult to visually recognize. The transmission region 22*b* is a region through which the light is transmitted. When the decorative object 10 is observed from the outside, the coating film layer 14 below the transmission region 22*b* is easily to visually recognize in the transmission region 22*b*.

The transmission region 22*b* is located between the plurality of colored regions 22*a* so as to fill between the plurality of colored regions 22*a*. It can also be understood that the transmission region 22*b* is a region connecting the plurality of colored regions 22*a*.

The color clear layer 16 is a layer that covers the printed layer 22. The color clear layer 16 is a layer that includes a coloring element for coloring and has translucency. The coloring element is, for example, an element that causes a change in appearance, and may be a pigment or a bright material. The color clear layer 16 may be formed of a color clear paint in which a pigment is added to a clear paint. The color clear layer 16 is observed as a darker color as a thickness increases. Therefore, a sense of depth is more likely to be felt than in an opaque colored layer or a colorless transparent layer.

In a region of the object to be decorated 12 where the printed layer 22 is not formed, the color clear layer 16 covers the coating film layer 14 without interposing the printed layer 22. Here, the color clear layer 16 includes a portion directly covering the printed layer 22 and a portion directly covering the coating film layer 14. Since the color clear layer 16 covers the printed layer 22 and the coating film layer 14, a level difference caused by the presence or absence of the printed layer 22 can be reduced.

The color clear layer 16 may be a single layer or may include a plurality of layers. In the present embodiment, the color clear layer 16 includes a plurality of color clear layers 17 and 18. Since the color clear layer 16 includes the plurality of color clear layers 17 and 18, various appearances can be implemented by a combination of the plurality of color clear layers 17 and 18. Since the color clear layers 17 and 18 also contribute to the formation of the translucent candy appearance, the color clear layers 17 and 18 may be understood as candy painting layers on which the candy painting is performed.

The color clear layer 16 may include a bright color clear layer to which bright particles are added. The entire color clear layer 16 may have the bright particles. Even when the color clear layer 16 includes the plurality of layers, the bright particles may be added to all the layers, or the bright particles may be added to at least one layer.

The present embodiment describes an example in which the lower color clear layer 17 is the bright color clear layer to which bright particles K are added, and the upper color clear layer 18 is the color clear layer that does not include the bright particles. The bright particles are particles that cause reflection of light, and are, for example, mica particles, pearl particles, metal particles (for example, aluminum particles), and pigments in which glass flakes are coated with metal, metal oxide (for example, titanium oxide), or the like.

When the color clear layer 16 includes the bright color clear layer 17, the light entering the bright color clear layer 17 is reflected by the bright particles at various positions in a thickness direction. Therefore, the sense of depth of the bright color clear layer 17 is obtained. Further, since the light is reflected by the scattered bright particles, the surface of the object to be decorated 12 is finely shiny at a large number of positions, and a glittering feeling is obtained. Accordingly, a texture of the object to be decorated 12 can be improved.

Further, when the color clear layer 18 is provided on a surface side with respect to the bright color clear layer 17, it is possible to cause a user to further feel the sense of depth and the glittering feeling due to the bright particles via the color clear layer 16 which generates the depth feeling. Accordingly, it is possible to cause the user to feel the complicated sense of depth and the glittering feeling, and to further improve the texture.

The transparent layer 19 is a colorless transparent layer covering the color clear layer 16. The transparent layer 19 may be formed by the painting. The transparent layer 19 is, for example, a UV (ultraviolet) curable layer formed of a transparent UV curable paint. Alternatively, the transparent layer 19 may be a layer formed of a transparent thermosetting coating material.

The transparent layer 19 can cause gloss on the surface of the object to be decorated 12. It is possible to easily cause a sense of thickness and a sense of quality due to a multilayer structure of the surface of the object to be decorated 12. The transparent layer 19 can also serve to prevent a level difference due to the printed layer 22 from appearing as a level difference in the appearance. The transparent layer 19 may be omitted.

Figure 3:
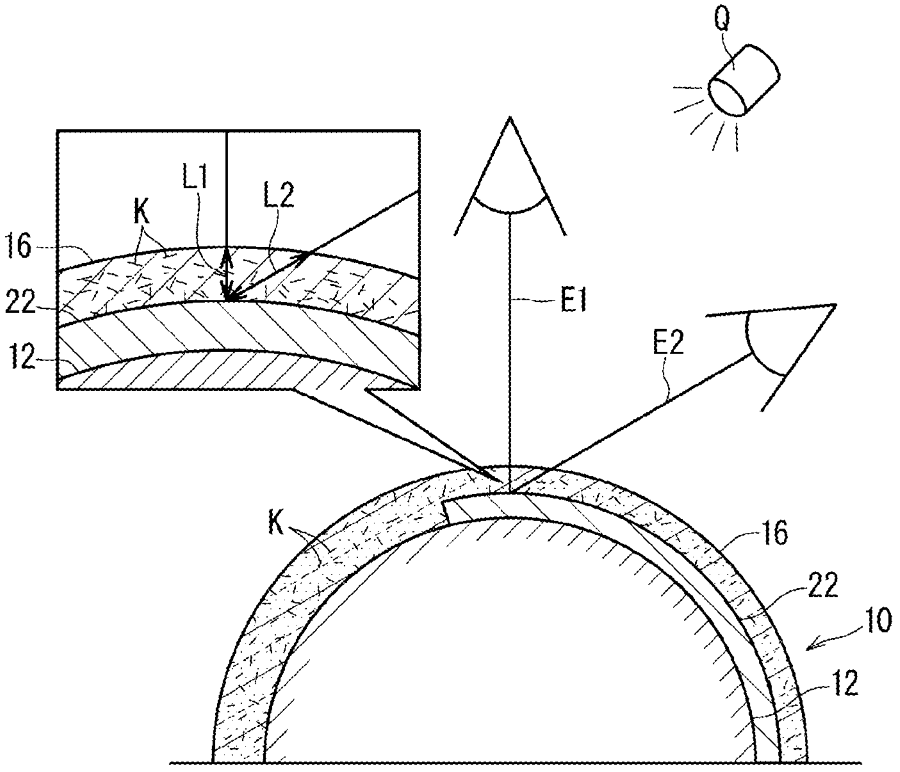
FIG. 3 is an explanatory diagram showing how the decorative object is seen when the decorative object is observed.

FIG. 3 is an explanatory diagram showing how the decorative object 10 is seen when the decorative object 10 is observed. For convenience of explanation, FIG. 3 shows that the printed layer 22 and the color clear layer 16 are formed on the surface of the object to be decorated 12. On the surface of the object to be decorated 12, there is a region where the printed layer 22 does not exist. Further, a bending manner of the decorative object 10, a layer thickness, and a size of the bright particles in the color clear layer 16 are drawn in an exaggerated manner.

A surface of the decorative object 10 or the printed layer 22 can be observed as a picture positioned behind the color clear layer 16 via the color clear layer 16. Since the color clear layer 16 is colored, the color clear layer 16 is observed in a dark color according to a thickness of the color clear layer 16. Therefore, a sense of depth of the color clear layer 16 is easily felt.

A shading of the color clear layer 16 changes depending on a direction in which the decorative object 10 is viewed and a way in which the light hits the decorative object 10. For example, it is assumed that the decorative object 10 is observed from a normal direction E1 of an observation site. In this case, the light travels through the color clear layer 16 by a distance L1 approximately equal to a minimum thickness of the color clear layer 16. Therefore, the color clear layer 16 is observed in a lighter color than in a case of observation from a direction E2 to be described below. Then, the decorative object 10 is observed from a direction E2 inclined from the normal direction E1 of the observation site. In this case, the light travels through the color clear layer 16 by a distance L2 obliquely with respect to a thickness direction of the color clear layer 16. Since the distance L2 is larger than the distance L1, the color clear layer 16 is observed in a darker color than in the case of the observation from the direction E1. Since the distance by which the light travels through the color clear layer 16 also varies depending on the direction in which the light from a light source Q hits, the shading of the color clear layer 16 in the decorative object 10 is similarly observed to vary. Therefore, the appearance of the decorative object 10 changes according to the viewing direction of the decorative object 10 and the light emission direction, and the appearance of the decorative object 10 is expressed abundantly.

When the surface of the object to be decorated 12 is a curved surface, the color clear layer 16 also has a curved surface shape. In this case, since the distance by which the light travels in the layer changes depending on the viewing position, the appearance is also different from this point.

When the bright particles K are added to the color clear layer 16, since the light is reflected at dispersed positions in the thickness direction of the color clear layer 16, the sense of depth of the color clear layer 16 is also more likely to be felt from this point. In addition, since the light is diffusely reflected in various directions, it is easy to feel the glittering feeling. Thereby, the texture is improved.

FIGS. 4A to 4D are explanatory views showing an example of a method for manufacturing the decorative object 10.

Figure 4A:
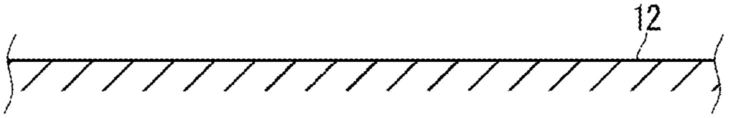
FIGS. 4A to 4D are explanatory diagrams showing an example of a method for manufacturing the decorative object.

First, as shown in FIG. 4A, the object to be decorated 12 is prepared.

Figure 4B:
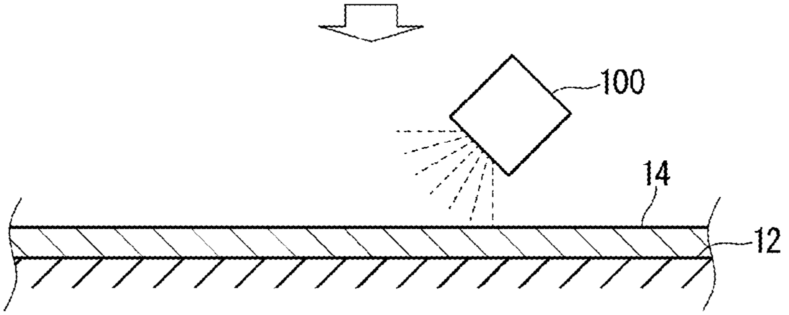

Next, as shown in FIG. 4B, the coating film layer 14 is formed so as to cover the surface of the object to be decorated 12. The coating film layer 14 is formed by, for example, blowing a painting liquid from a painting nozzle 100 onto the surface of the object to be decorated 12 and painting the surface thereof.

Figure 4C:
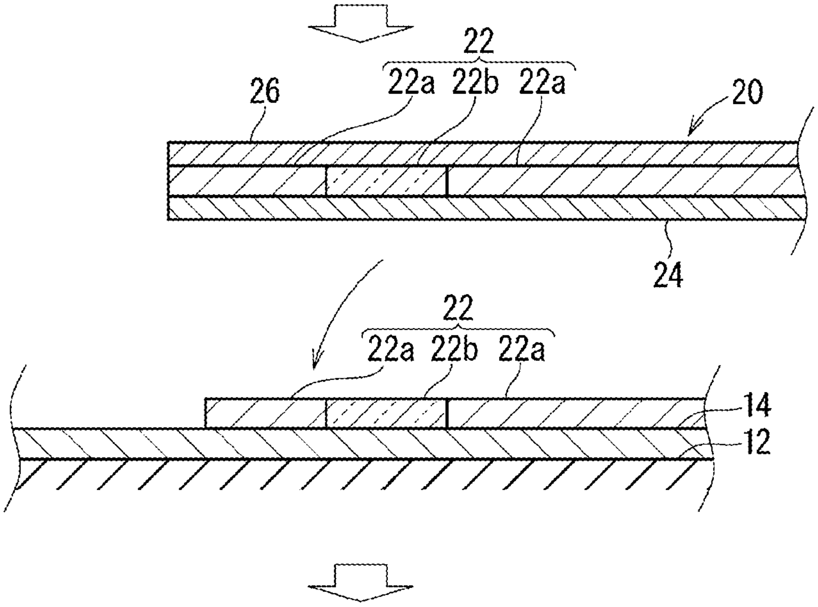

After the coating film layer 14 is dried, as shown in FIG. 4C, the printed layer 22 is formed so as to cover at least a part of the surface of the object to be decorated 12. The printed layer 22 may be formed by attaching the print sheet 20 to the object to be decorated 12.

Figure 5:
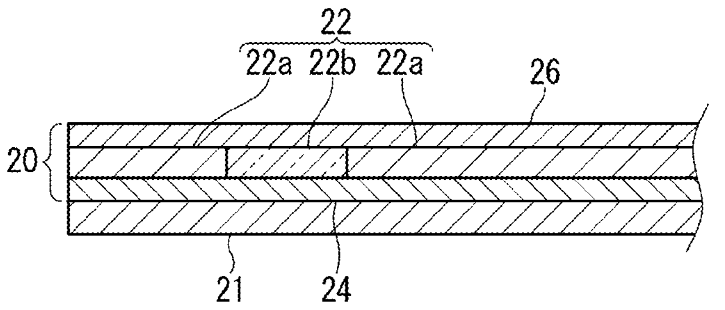
FIG. 5 is a cross-sectional view showing an example of a print sheet.

Here, an example of the print sheet 20 will be described. FIG. 5 is a cross-sectional view showing an example of the print sheet 20. FIG. 5 shows a state in which the print sheet 20 is attached to a base film 21.

The base film 21 is, for example, paper, and may not be paper.

The print sheet 20 is attached to the object to be decorated 12 in a state of being peeled off from the base film 21. The print sheet 20 includes an adhesive layer 24, the printed layer 22, and a cover coat layer 26. The adhesive layer 24, the printed layer 22, and the cover coat layer 26 are stacked in this order on the base film 21. Each of the layers 24, 22, and 26 may be formed by screen printing.

The adhesive layer 24 is formed of a water-soluble adhesive. The adhesive layer 24 forms a solid layer between the base film 21 and the printed layer 22. The printed layer 22 is formed on the adhesive layer 24.

As described above, the printed layer 22 is a layer for expressing a design such as a pattern or a character in the object to be decorated 12. The printed layer 22 may have a multilayer structure.

For example, the printed layer 22 may include an adhesion concealing layer. The adhesion concealing layer is a layer having a function of enhancing adhesion to a surface of an attachment target (here, the surface of the coating film layer 14) and a function of concealing a color of the surface of the attachment target (here, the surface of the coating film layer 14). The adhesion concealing layer is, for example, a water-insoluble adhesive having adhesion. The adhesion concealing layer may be a simple concealing layer that is not the adhesive.

The printed layer 22 may include a design layer for expressing the design and a clear layer covering the design layer. The design layer is, for example, a layer formed of color ink containing a pigment. The clear layer is a layer formed of transparent ink. In this case, the colored regions 22*a* are formed with the colored ink in regions where the design is to be formed on the adhesive layer 24. The clear layer is formed on the colored region 22*a* and over the entire region of the plurality of colored regions 22*a*. A portion of the clear layer formed in a region between the colored regions 22*a* can form the transmission region 22*b*.

Further, the design layer may be formed in the colored regions 22*a* on the adhesive layer 24, and the transmission region 22*b* formed of the transparent ink may be formed between the plurality of colored regions 22*a*. Also in this case, the clear layer may be formed over the entire colored regions 22*a* and the entire transmission region 22*b*.

The cover coat layer 26 is a resin layer covering the printed layer 22. The cover coat layer 26 covers the printed layer 22 in a state in which the cover coat layer 26 is easily peeled off from the printed layer 22. The ease of peeling of the cover coat layer 26 from the printed layer 22 can be implemented by the clear layer formed on the printed layer 22.

When the print sheet 20 attached to the base film 21 is immersed in water, the adhesive layer 24 is melted. Therefore, the print sheet 20 is easily peeled off from the base film 21. The print sheet 20 peeled off from the base film 21 is attached to the object to be decorated 12 via the adhesive layer 24. In a state in which the water and the water-soluble adhesive layer 24 remains between the object to be decorated 12 and the print sheet 20, a position of the print sheet 20 with respect to the object to be decorated 12 is adjusted. After position is adjusted, the water and the adhesive dissolved in the water between the object to be decorated 12 and the printed layer 22 are discharged to the outside. The adhesive layer 24 may remain between the object to be decorated 12 and the printed layer 22. The adhesive layer 24 is a layer in which the adhesive is formed on a base material, and may remain between the printed layer 22 and the object to be decorated 12 even after the attachment. Thereafter, the cover coat layer 26 is peeled off from the printed layer 22. Accordingly, a work of attaching the printed layer 22 to the object to be decorated 12 is completed.

The printed layer 22 is formed by printing on the base film 21, not on the surface of the object to be decorated 12. Therefore, it is possible to easily form the design having a color boundary as compared to a case in which the design having a color boundary is represented by the painting on the object to be decorated 12.

Figure 4D:
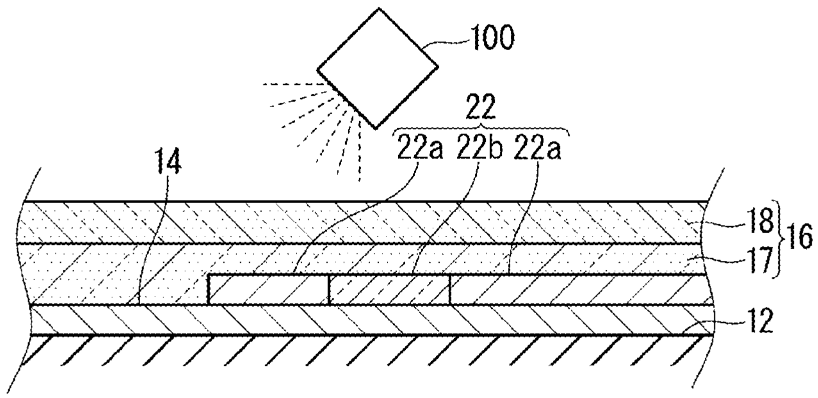

After the object to be decorated 12 is dried, as shown in FIG. 4D, the color clear layer 16 is formed so as to cover the surfaces of the coating film layer 14 and the printed layer 22. The color clear layer 16 is formed by, for example, blowing the painting liquid from the painting nozzle 100 onto the surface of the object to be decorated 12 and painting the surface thereof. When the color clear layer 16 includes the plurality of color clear layers 17 and 18, the painting liquid is sprayed a plurality of times to form the plurality of color clear layers 17 and 18.

After the color clear layer 16 is dried, the transparent layer 19 is formed so as to cover the surface of the color clear layer 16. The transparent layer 19 is formed, for example, by blowing a UV curable paint from the painting nozzle 100 to the surface of the object to be decorated 12 and painting the surface thereof. When the transparent layer 19 is cured, the work related to the decoration of the decorative object 10 is completed.

According to the decorative object 10 and the method for manufacturing the decorative object 10 configured as described above, the decorative object 10 is decorated by the appearance of the printed layer 22. Since the printed layer 22 is covered with the color clear layer 16, the printed layer 22 is observed through the color clear layer 16. That is, an observer sees the light that is reflected by the printed layer 22 and then transmitted through the color clear layer 16, and visually recognizes the appearance of the decorative object 10. Therefore, the sense of depth can be felt in the surface design of the decorative object 10. In addition, according to a positional relationship between the decorative object 10 and a viewpoint, the distances L1 and L2 by which the observed light passes through the color clear layer 16 change. The appearance of the decorative object 10 can be changed in accordance with the change in the distances L1 and L2. That is, the expression by the printed layer 22 can be changed depending on the difference in the positional relationship between the viewpoint with respect to the decorative object 10. In addition, similarly, the expression by the printed layer 22 can be changed due to a difference in a positional relationship between the light source and the decorative object 10. Accordingly, various appearance expressions can be implemented, and the number of appearance expressions of the decorative object 10 can be increased. In this way, it is possible to improve the texture of the appearance by changing the appearance expression according to the viewpoint or the like.

The printed layer 22 covers a part of the coating film layer 14, and the color clear layer 16 covers the coating film layer 14 and the printed layer 22. Therefore, the decorative object 10 is decorated by a combination of the appearance of the coating film layer 14 and the appearance of the printed layer 22. Further, since the coating film layer 14 and the printed layer 22 are covered with the color clear layer 16, not only the printed layer 22 but also the coating film layer 14 is observed through the color clear layer 16. This makes it possible to improve the appearance texture of the portion of the decorative object 10 decorated by the coating film layer 14 in addition to the printed layer 22.

The printed layer 22 is implemented by the print sheet 20 attached to the object to be decorated 12. Therefore, it is easy to perform the coating work as compared to a case in which the coating is performed on the object to be decorated 12 by the coating. Then, painting defects due to the coating can be prevented, and a yield can be improved.

Specifically, whether the printed layer 22 partially covers the coating film layer 14 or does not partially mask the coating film layer 14, a portion of the coating film layer 14 in which the color remains and a portion of the printing layer 22 in which the color is colored can be color-coded. Accordingly, when regions of a plurality of colors are formed in the decorative object 10, it is possible to facilitate the decoration as compared to a case in which the coating is performed by masking.

Further, since the color clear layer 16 is covered with the transparent layer 19, the appearance texture of the decorative object 10 can be further improved.

Since the printed layer 22 includes the plurality of colored regions 22*a* and the transmission region 22*b* between the plurality of colored regions 22*a*, it is possible to implement an expression in which the plurality of colored regions 22*a* are provided at the interval. In particular, by making the lower coating film layer 14 appear in the transmission region 22*b*, the decorative object 10 can be expressed by being divided into a plurality of colors. The interval between the plurality of colored regions 22*a* is easily kept constant by the transmission region 22*b*.

Since the color clear layer 16 includes the bright color clear layer 17 to which the bright particles K are added, the appearance texture can be further improved. Since the light is diffusely reflected by the bright particles K, the appearance can be made different as compared to a case in which the bright particles are not present.

Further, according to the method for manufacturing the decorative object 10, the decorative object 10 is decorated by the appearance of the printed layer 22. Since the printed layer 22 is covered with the color clear layer 16, the printed layer 22 is observed through the color clear layer. Accordingly, the appearance texture of the object decorated by the printed layer can be improved.

Examples of the object to be decorated 12 and the layers on the surface of the object to be decorated 12 are not limited to the above-described embodiment, and various modifications are possible.

Figure 6:
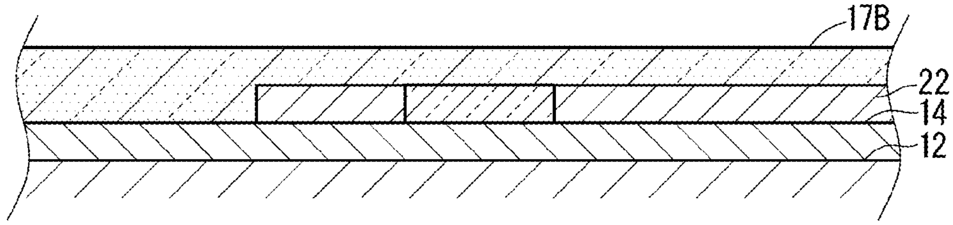
FIG. 6 is a partial cross-sectional view showing a decorative object according to a modification.

For example, as shown in FIG. 6, the printed layer 22 may be formed on the surface of the object to be decorated 12, and one color clear layer 17B may be formed on the printed layer 22.

In the region where the printed layer 22 is not present, the color clear layer 17B may be directly formed on the coating film layer 14 or the surface of the object to be decorated 12. The coating film layer 14 may or may not be formed on the surface of the object to be decorated 12. The transparent layer 19 according to the above-described embodiment may or may not be formed on a surface of the color clear layer 17B.

Figure 7:
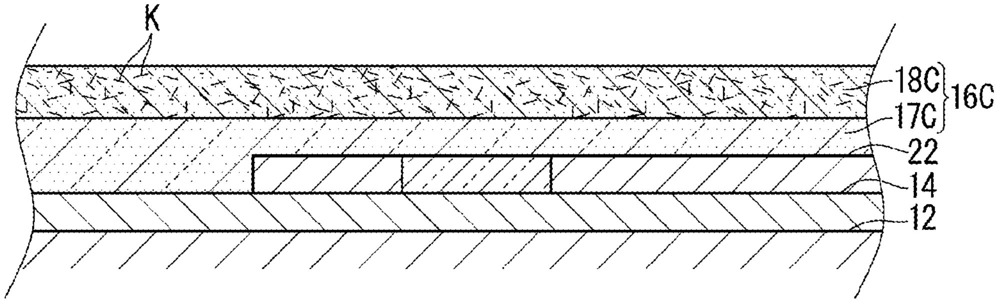
FIG. 7 is a partial cross-sectional view showing a decorative object according to another modification.

For example, as shown in FIG. 7, the printed layer 22 may be formed on the surface of the object to be decorated 12, and a color clear layer 16C having a multilayer structure may be formed on the printed layer 22. In this case, a part of a color clear layer 17C constituting the color clear layer 16C may contain a pigment or the like, and a color clear layer 18C that is the other part of the color clear layer 16C may contain a bright material in which the bright particles K serving as an example of the bright material are mixed in a colorless and transparent layer. A stacking order of the color clear layer 17C and the bright material-containing color clear layer 18C is set freely. FIG. 7 shows a case in which the bright material-containing color clear layer 18C is positioned on the pigment-containing color clear layer 17C.

Similarly to the above, in the region where the printed layer 22 is not present, the color clear layer 16C may be directly formed on the coating film layer 14 or the surface of the object to be decorated 12. The coating film layer 14 may or may not be formed on the surface of the object to be decorated 12. The transparent layer 19 according to the above-described embodiment may or may not be formed on a surface of the color clear layer 16C.

Figure 8:
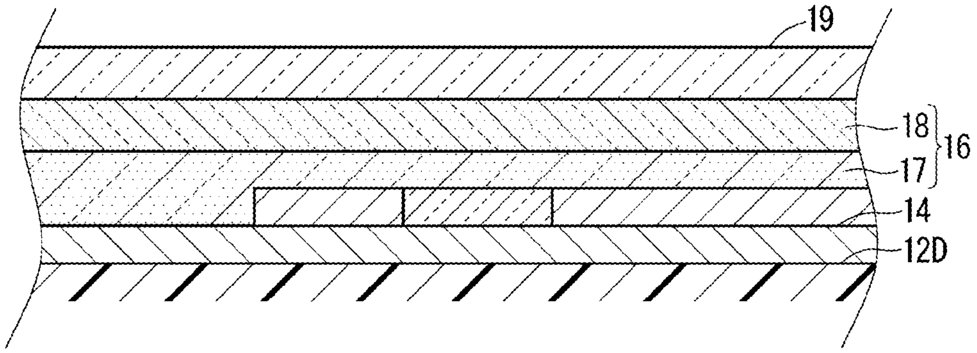
FIG. 8 is a partial cross-sectional view showing a decorative object according to still another modification.

Further, for example, as shown in FIG. 8, an object to be decorated 12D may be made of resin instead of metal.

The configurations described in the above embodiment and the modifications can be combined as appropriate as long as they do not contradict each other.

The above description is illustrative in all aspects, and the present invention is not limited thereto. It is to be understood that numerous modifications that are not shown can be conceived without departing from the scope of the present invention.

The present specification and drawings relates to the following aspects.

According to a first aspect of the present disclosure, a decorative object includes: an object to be decorated; a printed layer covering at least a part of a surface of the object to be decorated; and a color clear layer covering the printed layer.

According to the first aspect, the object to be decorated is decorated by the appearance of the printed layer. Since the printed layer is covered with the color clear layer, the printed layer is observed through the color clear layer. That is, the observer sees the light that is reflected by the printed layer and then transmitted through the color clear layer, and visually recognizes the appearance of the decorative object. Depending on the positional relationship between the decorative object and the viewpoint, the transmission distance by which the light is transmitted through the color clear layer changes. In accordance with the change in the transmission distance, a slight change in the appearance can be caused. In this way, it is possible to slightly change the expression of the printed layer in accordance with the change in the viewpoint with respect to the decorative object, and it is possible to improve the texture of the appearance by the change in the appearance expression in accordance with the viewpoint by which the appearance expression can be increased.

According to a second aspect of the present disclosure, a decorative object may further include a coating film layer covering at least a part of the surface of the object to be decorated between the surface of the object to be decorated and the printed layer. The printed layer may cover a part of the coating film layer, and the color clear layer may cover the coating film layer and the printed layer.

Accordingly, the decorative object is decorated by the appearance of the coating film layer and the printed layer. Since the coating film layer and the printed layer are covered with the color clear layer, the coating film layer and the printed layer are observed through the color clear layer. Accordingly, the appearance texture of the object decorated by the coating film layer and the printed layer can be improved.

According to a third aspect of the present disclosure, the printed layer may include a print sheet attached to the object to be decorated.

Accordingly, by preparing the sheet printed in advance, it is possible to prevent defects caused by the coating and improve the yield as compared to a case in which the coating is performed by the painting.

According to a fourth aspect of the present disclosure, a decorative object may further include a transparent layer covering the color clear layer.

The transparent layer can improve the appearance texture of the decorative object.

According to a fifth aspect of the present disclosure, the printed layer may include a plurality of colored regions provided at an interval and a transmission region provided between the colored regions.

This makes it possible to implement the expression in which the plurality of colored regions are provided at the interval. The interval between the plurality of colored regions is easily kept constant by the transmission region.

According to a sixth aspect of the present disclosure, the color clear layer may include a bright color clear layer to which a bright particle is added.

In this case, the appearance texture can be further improved by the bright color clear layer to which the bright particles are added. Since randomness of light reflection is increased, the appearance is different from that in a case in which there are no bright particles.

According to a seventh aspect of the present disclosure, a method for manufacturing a decorative object includes: providing an object to be decorated; forming a printed layer so as to cover at least a part of a surface of the object to be decorated; and forming a color clear layer by painting so as to cover the printed layer.

According to this manufacturing method, the decorative object is decorated by the appearance of the printed layer. Since the printed layer is covered with the color clear layer, the printed layer is observed through the color clear layer. Accordingly, it is possible to increase the appearance expression of the object decorated by the print layer.

Color combinations in each layer on the surface of the object to be decorated 12 are described, for example, as shown in Tables 1 and 2.

TABLE 1

| | First color combination | Second color combination | Third color combination |
|---|---|---|---|
| Coating film layer 14 | Black | Black | Black |
| Colored region 22a | Pink | Light yellow (like skin color) | Light green |
| Bright color clear layer 17 | Transparent color containing bright material | Transparent color containing bright material | Transparent color containing bright material |
| Color clear layer 18 | Translucent orange | Translucent yellow | Translucent green |
| Appearance in portion without colored region 22a | Brown | Green | Dark green |
| Appearance in portion with colored region 22a | Orange | Yellow | Light green |

TABLE 2

| | Fourth color combination | Fifth color combination | Sixth color combination |
|---|---|---|---|
| Coating film layer 14 | Black | Black | Black |
| Colored region 22a | Light blue | Light red | Light gray |
| Bright color clear layer 17 | Transparent color containing bright material | Transparent color containing bright material | Transparent color containing bright material |
| Color clear layer 18 | Candy blue | Candy red | Candy gray |
| Appearance in portion with colored region 22a | Sky blue | Red | Gray |

Additional color combinations may be easily derived by those skilled in the art. The above description is illustrative in all aspects, and the present invention is not limited thereto. It is to be understood that numerous color combinations that are not shown can be conceived without departing from the scope of the present invention.

What is claimed is:

1. A decorative object comprising:

an object to be decorated;

a printed layer including a design layer, and covering at least a part of a surface of the object to be decorated; and a color clear layer covering the printed layer, and including a coloring element for coloring and translucency, wherein the color clear layer includes an area covering the printed layer and an other area covering a portion that is not covered by the printed layer of the object to be decorated, such that the color clear layer has a different thickness depending on painted areas of the decorative object, wherein the color clear layer comprises a plurality of color clear layers, and wherein, among the plurality of color clear layers, a lower color clear layer comprises reflective particles, and an upper color clear layer is free of the reflective particles.

2. The decorative object according to claim 1, further comprising:

a coating film layer covering the surface of the object to be decorated, wherein the color clear layer includes the area covering the printed layer and the other area covering the coating film that is not covered by the printed layer, such that the color clear layer has the different thickness depending on the painted areas of the decorative object.

3. The decorative object according to claim 1, wherein the printed layer includes a print sheet attached to the object to be decorated, the print sheet covers a part of the surface of the object to be decorated, and the color clear layer has the different thickness depending on the painted areas of the decorative object by covering the area covering the printed sheet and the other area except for the printed sheet.

4. The decorative object according to claim 1, further comprising:

a transparent layer covering the color clear layer.

5. The decorative object according to claim 1, further comprising:

a coating film layer covering the surface of the object to be decorated, wherein the printed layer includes a plurality of colored regions provided at an interval and a transmission region provided between the colored regions to pass through light, and the transmission region of the printed layer covers the coating film layer.

6. The decorative object according to claim 1, wherein the color clear layer includes a reflective color clear layer to which a reflective particle is added.

7. The decorative object according to claim 1, further comprising:

a coating film layer covering at least a part of the surface of the object to be decorated between the surface of the object to be decorated and the printed layer, wherein the color clear layer includes a portion directly covering the printed layer and a portion directly covering the coating film layer.

8. The decorative object according to claim 1, wherein the printed layer includes a clear layer covering the design layer; and the color clear layer covering the printed layer is disposed on an upper surface of the clear layer.

9. The decorative object according to claim 1, wherein a surface of the object to be decorated is a curved surface.

10. A method for manufacturing a decorative object, the method comprising:

providing an object to be decorated;

forming a coating film layer by painting the object to be decorated covering a surface of the object to be decorated by the coating film layer;

forming a printed layer including a design layer by attaching a print sheet to the object to be decorated, so as to cover at least a part of a surface of the object to be decorated;

attaching the printed layer to an area of a part of the coating film layer; and forming a color clear layer that includes a coloring element for coloring and translucency by painting so as to cover both of the printed layer and an area of the object to be decorated that is exposed from the printed layer, wherein the color clear layer includes an area covering the printed layer and an other area covering a portion that is not covered by the printed layer of the object to be decorated, such that the color clear layer has a different thickness depending on painted areas of the decorative object, and wherein the forming of the color clear layer includes painting both of the printed layer and the coating film layer except for the print sheet.

11. A decorative object comprising:

an object to be decorated;

a printed layer including a design layer, and covering at least a part of a surface of the object to be decorated; and a color clear layer covering the printed layer, and including a coloring element for coloring and translucency, wherein the color clear layer includes an area covering the printed layer and an other area covering a portion that is not covered by the printed layer of the object to be decorated, such that the color clear layer has a different thickness depending on painted areas of the decorative object, and wherein the color clear layer comprises:

a first layer that comprises reflective particles and is disposed on an upper surface of the printed layer; and a second layer that is free of the reflective particles and is disposed on an upper surface of the first layer; and a transparent layer that is disposed on an upper surface of the second layer of the color clear layer.

12. The decorative object according to claim 11, wherein the transparent layer is not in contact with the first layer of the color clear layer.

13. The decorative object according to claim 11, wherein the reflective particles of first layer of the color clear layer reflect light entering the color clear layer at dispersed positions in a thickness direction of the first layer of the color clear layer.

14. A method for manufacturing a decorative object that includes an object to be decorated, a printed layer including a design layer, and covering at least a part of a surface of the object to be decorated, and a color clear layer covering the printed layer, and including a coloring element for coloring and translucency, wherein the color clear layer includes an area covering the printed layer and an other area covering a portion that is not covered by the printed layer of the object to be decorated, such that the color clear layer has a different thickness depending on painted areas of the decorative object, the method comprising:

forming a coating film layer by painting the object to be decorated firstly;

attaching the printed layer to an area of a part of the coating film layer; and forming the color clear layer by painting both of the printed layer and the coating film layer except for a print sheet.

15. The method for manufacturing the decorative object according to claim 14, wherein the color clear layer comprises a plurality of color clear layers.

16. The method for manufacturing the decorative object according to claim 15, wherein, among the plurality of color clear layers, a lower color clear layer comprises reflective particles, and an upper color clear layer is free of the reflective particles.

17. The method for manufacturing the decorative object according to claim 16, wherein a transparent layer, which is a colorless transparent layer and covers the color clear layer, is formed by a transparent curable paint.

18. A decorative object comprising:

an object to be decorated;

a printed layer including a design layer, and covering at least a part of a surface of the object to be decorated; and a color clear layer covering the printed layer, and having a coloring element for coloring and translucency, wherein the color clear layer has a different thickness depending on a painted area of the decorative object, the color clear layer comprises a plurality of color clear layers, and among the plurality of color clear layers, a lower color clear layer comprises reflective particles, and an upper color clear layer is free of the reflective particles.

* * * * *